United States Patent [19]

Scarola

[11] 4,011,974
[45] Mar. 15, 1977

[54] VEHICLE CARGO STRAP

[76] Inventor: Dominick Frank Scarola, 242 W. Mount Pleasant Ave., Livingston, N.J. 07039

[22] Filed: June 6, 1975

[21] Appl. No.: 584,255

[52] U.S. Cl. .................. 224/42.1 B; 24/115 R; 105/471; 280/179 A
[51] Int. Cl.² .............. B60R 9/04; B60R 11/00; B61D 45/00; F16G 11/10
[58] Field of Search ......... 24/115 R; 105/466, 467, 105/468, 469; 224/42.1 B, 42.1 F, 42.1 R; 280/179 A

[56] References Cited
UNITED STATES PATENTS

| | | | |
|---|---|---|---|
| 2,442,266 | 5/1948 | Davis | 105/473 |
| 2,472,026 | 5/1949 | Peck et al. | 24/115 R |
| 2,477,265 | 7/1949 | Peck | 24/115 R |
| 2,539,997 | 1/1951 | Graves | 224/42.1 F |
| 2,825,522 | 3/1958 | Bolmes et al. | 105/367 |
| 2,833,453 | 5/1958 | Barreca | 224/42.1 F |
| 2,998,625 | 9/1961 | Huber | 105/469 X |
| 3,099,313 | 7/1963 | Peck et al. | 105/467 X |

Primary Examiner—Robert J. Spar
Assistant Examiner—Howard Beltran
Attorney, Agent, or Firm—Larson, Taylor and Hinds

[57] ABSTRACT

An apparatus for securing a cargo to a vehicle and preferably to the roof thereof is provided which comprises a fastening mechanism attached to one end of an elongate flexible member for securing that end to the vehicle, a slidable hook mechanism coaxially mounted on the member for securing the other end of the member to the vehicle, and a slidable positioning mechanism coaxially mounted on and securable to the flexible member for positioning the hook mechanism. In operation, the fastening mechanism is preferably attached to a cargo carrier or placed under a rain gutter mounted on the top of the vehicle. The flexible member is placed over the cargo that has been positioned on the vehicle roof and the hook mechanism is preferably placed under the other side of the cargo carrier or the other rain gutter. The cord is pulled taut, and the positioning and hook mechanism are adjusted, thereby securing the cargo.

7 Claims, 4 Drawing Figures

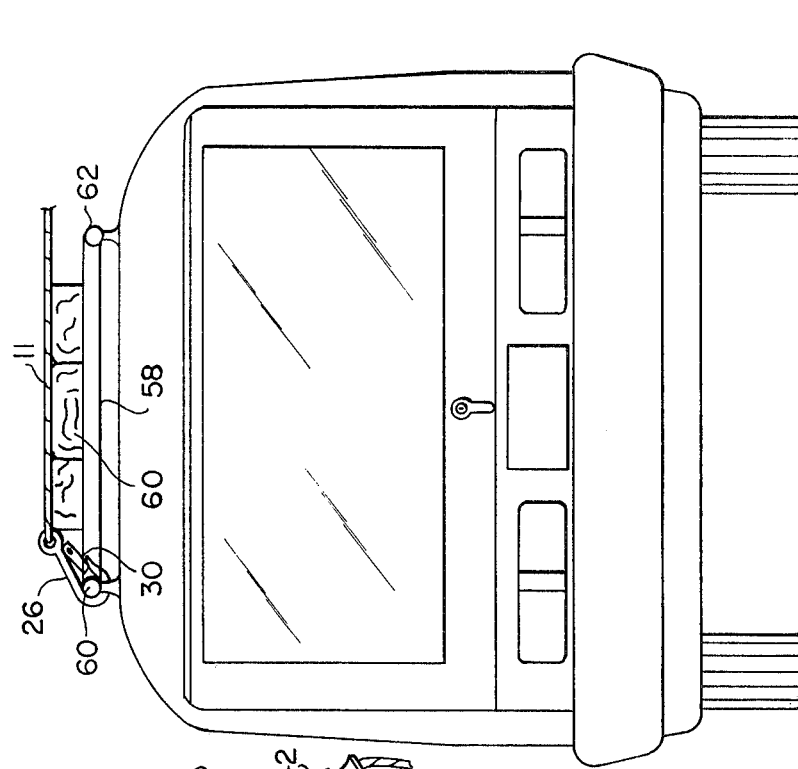
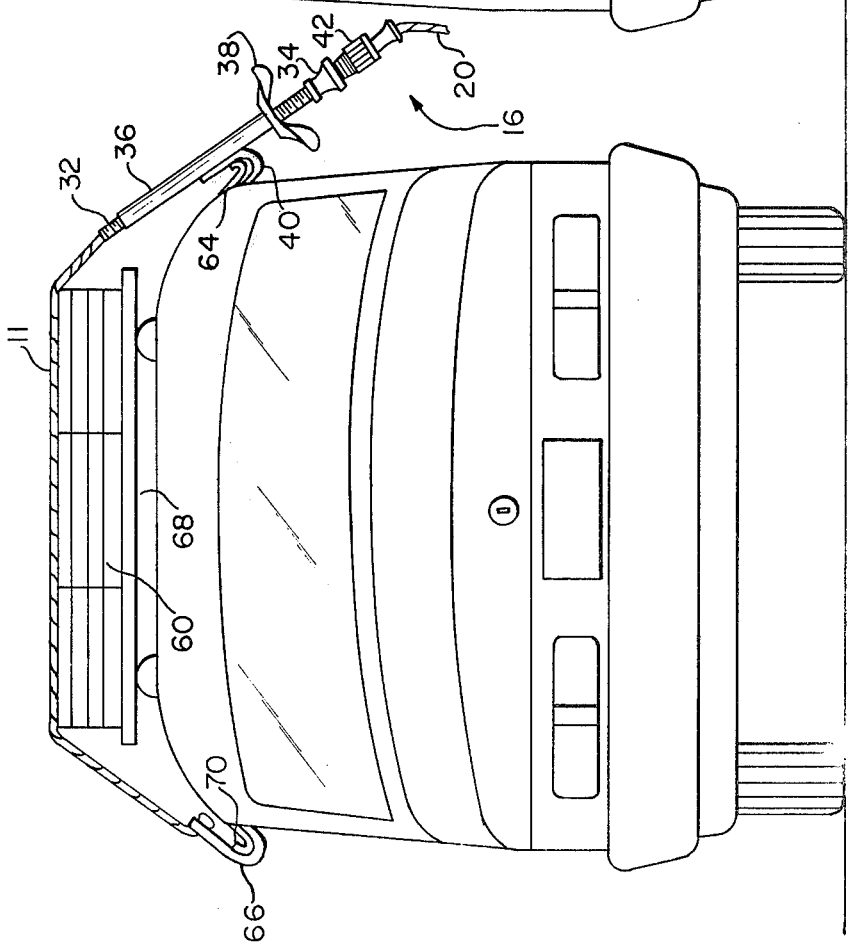

VEHICLE CARGO STRAP

BACKGROUND OF THE INVENTION

This mechanism relates to a cargo strap apparatus and, more particularly, apparatus for securing cargo to a vehicle and the like.

DESCRIPTION OF THE PRIOR ART

Prior art devices used in securing cargo to a vehicle characteristically comprise strap mechanisms that do not have highly efficient mechanical advantages. Such devices, as for example the devices described in U.S. Pat. No. 2,442,266 issued to Davis, U.S. Pat. No. 2,539,997 issued to Graves, and U.S. Pat. No. 2,825,52 issued to Bolmes, can generally only be tightened an amount which varies with the strength of the person using the strap. Consequently, because such devices are not always tightened sufficiently, they become increasingly unsafe the heavier the load becomes and the larger the acceleration forces become.

SUMMARY OF THE INVENTION

The present invention provides for a vehicle cargo strap with a highly efficient mechanical advantage, namely a mechanical screw. Thus using the mechanical screw, a person will be able to more securely position the cargo, to withstand acceleration forces, than would be possible without the mechanical advantage.

In addition, the hook mechanism and positioning mechanism, being slidable along the flexible member, provide for a cargo strap with a variable length flexible member for accommodating various sizes and shapes of cargo. The tightening procedure involves two stages: first holding the cargo in position with the hook and positioning mechanism, and second firmly securing the cargo using the mechanical advantage of the screw that is built into the hook mechanism. Consequently the ungainly procedure of having to position and tighten the cargo and strap in one step is obviated.

Further, if desired the flexible member is replaceable by other flexible members capable of withstanding greater loading stresses.

In accordance with a preferred embodiment of the invention a vehicle cargo strap is provided which comprises a flexible connecting member, a fastening mechanism attached proximal to the first end of the connecting member for fastening the connecting member to a vehicle, a hook mechanism, slidably coaxially mounted on the connecting member for fastening the second end of the connecting member to a vehicle, and a positioning mechanism, slidably coaxially mounted between the hook mechanism and the second end of the connecting member for positioning the hook along the connecting member.

Additional features and advantages of the invention will be set forth in, or apparent from, the detailed description of the preferred embodiments of the invention found hereinbelow.

BRIEF DESCRIPTION OF THE DRAWINGS

FIG. 2 is a rear view of the cargo strap enlarged to show the details thereof, as shown in FIG. 1 in use with a permanently attached cargo rack;

FIG. 3 is a rear view of another embodiment of the invention, enlarged to show the details thereof, in use with a removable cargo rack.

DETAILED DESCRIPTION OF THE PREFERRED EMBODIMENT

Figure 1:
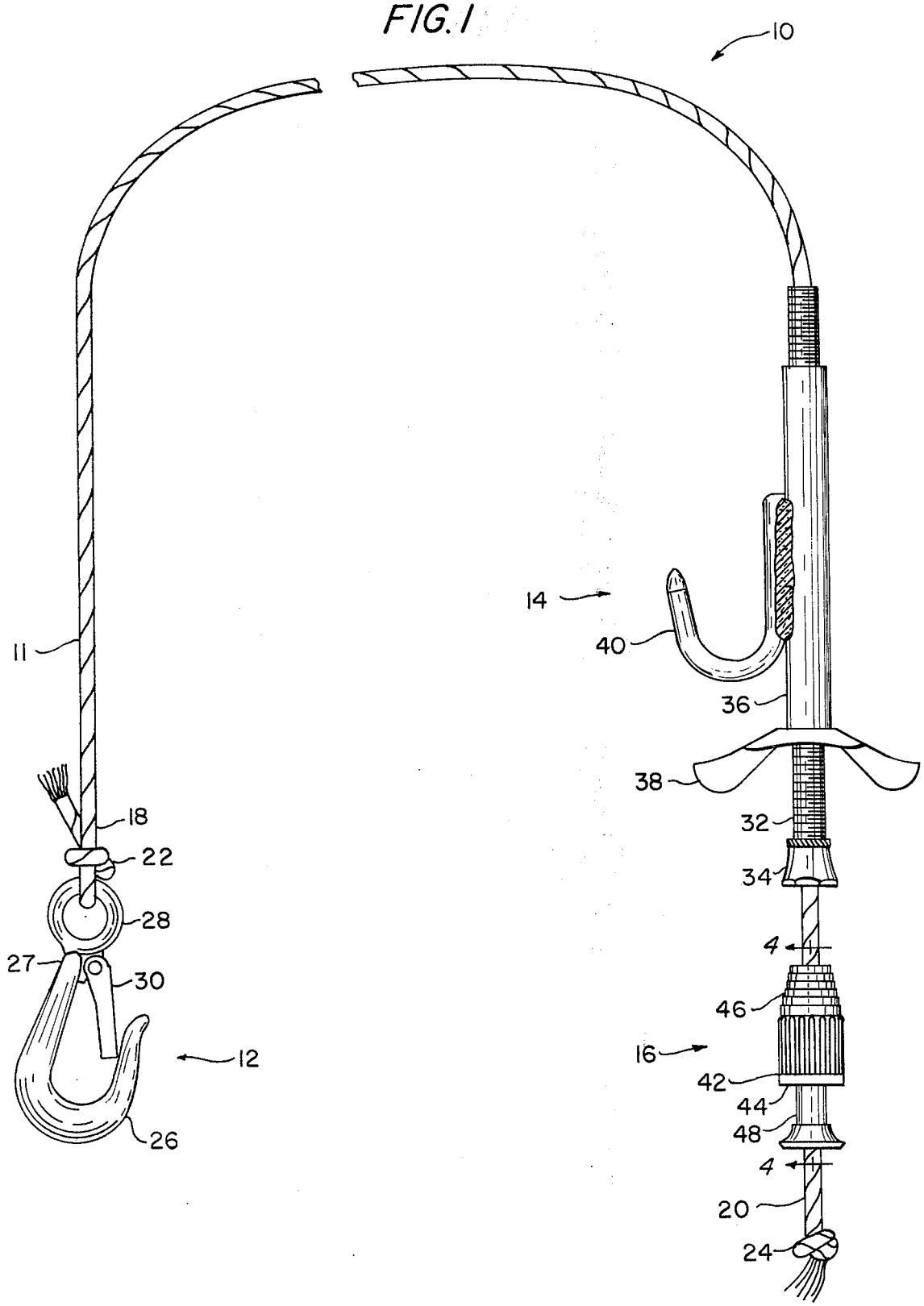
FIG. 1 is a plan view of a vehicle cargo strap in accordance with the invention.

Referring to the drawings, and, in particular to FIG. 1, a vehicle cargo strap 10 in accordance with the invention is depicted. The cargo strap can be considered for purposes of description to comprise four functional units which include a flexible connecting member or cord 11, a fastening mechanism 12, a hook mechanism 14 and a positioning mechanism 16.

Cord 11 is comprised of two ends 18 and 20. To end 18 of cord 11 is secured fastening mechanism 12 preferably with a knot 22. A knot 24 is also depicted at end 20 of cord 10.

The fastening mechanism 12 comprises a hook 26 with a base 27, a ring 28 attached to base 27 of hook 26, and a spring loaded safety latch 30 pivotally attached to base 27 of hook 26. Safety latch 30 is held in contact with hook 26 by a spring (not shown) mounted between base 27 and safety latch 30.

Hook mechanism 14 is slidably coaxially mounted on cord 11 between end 18 and 20. Hook mechanism 14 comprises a threaded shaft 32 slidably coaxially mounted on cord 11 with a central bore therethrough and an end stop 34, a sleeve 36, slidably coaxially mounted on shaft 32, a threaded wing nut 38 compatible with and threaded on threaded shaft 32 between end stop 34 and sleeve 36, and a hook 40 rigidly secured to sleeve 36 by, for example, being welded thereto or integrally molded therewith. In an operational position, wing nut 38 abuts sleeve 36 at one end thereof. As wing nut 38 is rotated to advance the position thereof on shaft 32, sleeve 36 is urged along shaft 32. A complete rotation of wing nut 38 increments sleeve 36 along shaft 32 a distance equal to the pitch of the threads on shaft 32.

Figure 4:
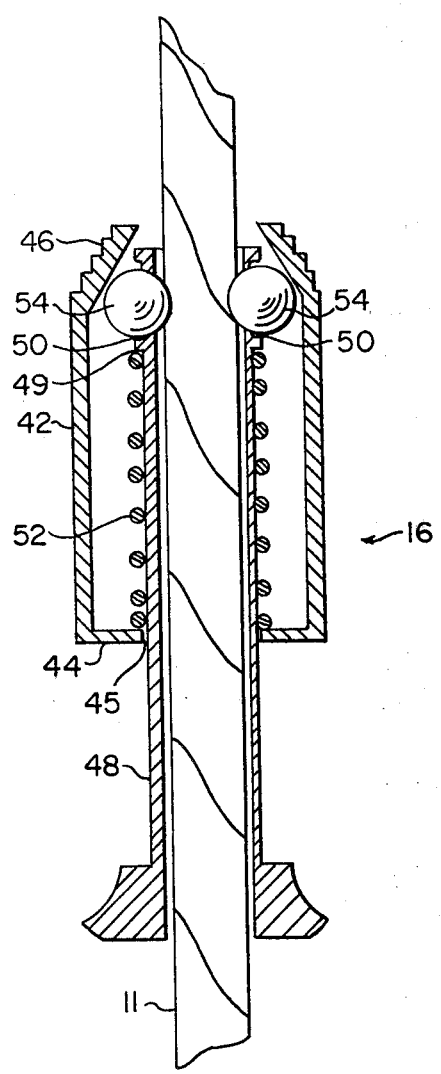
FIG. 4 is a cross-sectional view taken along line 4—4 in FIG. 1.

Positioning mechanism 16 is slidably coaxially mounted on cord 11 between hook mechanism 14 and end 20 of cord 11 and is prevented from slipping off of cord 11 by knot 24. As can best be seen in FIG. 4, positioning mechanism 16 comprises a cylindrical housing 42, having a flat annular end 44 with an orifice 45 and a tapered end 46, a cylindrical plunger 48, having a flanged end 49, loosely extending through orifice 45 into the interior of housing 42. The outer surface of housing 42 is knurled for permitting easier grasping. A plurality of apertures 50 are spaced about the circumference of end 49 of plunger 48 and a coil spring 52, coiled about plunger 48, is positioned between the interior surface of annular end 44 of housing 42 and flanged end 49 of plunger 48. A plurality of ball bearings 54 are received respectively by plurality of apertures 50. Ball bearings 54 are confined in the corresponding apertures 50 by cord 11 and the interior walls of housing 42. Spring 52 urges plunger 48 towards the interior surface of tapered end 46 of housing 42. Therefore, plurality of ball bearings 54 mounted in plurality of apertures 50 are simultaneously urged toward and into contact with the interior surface of tapered end 46. Since ball bearings 54 are then in contact with the interior surface of tapered end 46, the continued motion of plunger 48 causes the ball bearings 54 to roll on an increasingly tapered interior surface of tapered end 46. Thus ball bearings 54 are forced inward toward the axis of cylindrical plunger 48 by the tapered end 46. However, since plunger 48 is mounted coaxially on cord 11, this inward motion of ball bearings 54 places force on cord 11. Cord 11 is thus pinched between the ball bearings 54. Mechanism 14 is thus lockingly positioned on cord 11.

One procedure for adjusting the positions of mechanism 16 relative to cord 11 is by gripping the knurled housing 42 and pulling plunger 48 outwardly from orifice 45 of annular end 44. This action compresses spring 52 and releases ball bearings 54 from contact with the interior surface of tapered end 46. Thus ball bearings 54 no longer pinch cord 11 and ball bearings 54 and mechanism 16 are slidable on cord 11 until plunger 48 is released and spring 52 again forces ball bearings 54 against the interior surface of tapered end 46, thereby pinching cord 11. The effect of adjusting the position of mechanism 16 relative to cord 11 is to vary the length of cord 11 between fastening mechanism 12 and positioning mechanism 16.

An alternative procedure for adjusting the position mechanism 16 relative to cord 11 is by gripping the knurled housing 42 and urging it along cord 11 toward fastening mechanism 12. This motion causes ball bearings 54 to roll out of contact with the interior surface of tapered end 46 thereby releasing the pinching engagement of ball bearings 54 with cord 11. Spring 52 is also slightly compressed. If, however, an attempt is made to urge knurled housing 42 along cord 11 toward end 20 of cord 11, ball bearings 54 do not roll out of contact with the interior surface of tapered end 46. In fact, this motion forces ball bearings 54 toward an increasingly tapered portion of the interior surface of tapered end 46 and consequently as previously discussed creates a locking engagement between ball bearings 54 and cord 11.

Referring to FIG. 2 the operation of cargo strap 10 in conjunction with a vehicle that has a permanently secured roof rack 58 is as follows: Hook 26 is placed around end 60 of rack 58 and safety latch 30 secures hook 26 thereto. Cord 11 is placed over cargo 60. Then hook 40 of hook mechanism 14 is placed around (this configuration is not depicted in FIG. 2) end 62 of rack 58 or under a rain gutter such as gutter 64 in FIG. 3. Positioning mechanism 16 is slid along cord 11 until it abuts end stop 34, thereby holding hook mechanism 14 in position around end 62 of rack 58 (see FIG. 2) or under rain gutter 64 (see FIG. 3). Wing nut 38 is then advanced which in turn causes sleeve 36 to advance along threaded shaft 32. Since end stop 34 of shaft 32 already abuts positioning mechanism 16, the advancement of nut 38 increases the amount of force that hook mechanism 14 places on positioning mechanism 16. However, mechanism 16 is in locking engagement with cord 11. Consequently, as nut 38 is advanced, cord 11 becomes increasingly taut. Since cord 11 is placed over cargo 60, as in FIG. 2, as cord 11 becomes increasingly taut, it securely confines cargo 60 to the vehicle.

An alternate embodiment of cargo strap 10 is depicted in FIG. 3. This embodiment comprises a clip 66 which serves the same purpose as fastening mechanism 12 shown in FIG. 1.

Referring to FIG. 3, the operation of the alternate embodiment of cargo strap 10 in conjunction with a vehicle that has a removable roof rack 68 is as follows. Clip 66 is placed under rain gutter 70. Cord 11 is placed over cargo 60 and hook 40 of hook mechanism 14 is placed under rain gutter 64. Cord 11 is then pulled taut using the same procedure as described above for the first embodiment.

Although the present invention has been described relative to an exemplary embodiment thereof, it will be understood by those skilled in the art that variations and modifications can be effected in these embodiments without departing from the scope and spirit of the invention.

I claim:

1. Vehicle cargo strap for securing a load to a vehicle comprising:
   an elongate flexible connecting member with a first and second end;
   a fastening means attached proximal to said first end of said connecting member for fastening said first end to the vehicle;
   a hook means secured to a sleeve, said sleeve slidably, coaxially mounted on said connecting member, said hook means for fastening said second end of said connecting member to a vehicle; and
   a positioning means, slidably, coaxially mounted on said connecting member between said sleeve and the second end of said connecting member, said positioning means for positioning said hook means along said connecting member, said positioning means including pinching means for securing said positioning means to said connecting member.

2. Apparatus in accordance with claim 1 wherein said fastening means comprises a hook member with a safety latch.

3. Apparatus in accordance with claim 1 wherein said fastening means comprises a clip member.

4. Apparatus in accordance with claim 1 wherein said strap further comprises a tensioning means for increasing the tension in said connecting member.

5. Apparatus in accordance with claim 4 further including an externally threaded shaft with a central bore therethrough, said bore slidably coaxially mounted on said connecting member between said sleeve and said connecting member, and
   wherein said tensioning member comprises a nut threaded onto said threaded shaft, the positioning of said nut along said threaded shaft for positioning said sleeve relative to said threaded shaft.

6. Apparatus in accordance with claim 5 wherein said positioning means further comprises:
   a cylindrical housing having an annular end and a tapered end;
   a cylindrical plunger having a flanged end, said flanged end loosely received by said annular end of said housing, said pinching means mounted on said plunger; and
   a spring coaxially mounted on said plunger between said flanged end of said plunger and said annular end of said housing, for urging said pinching means into engagement with said connecting member.

7. Apparatus in accordance with claim 6 wherein said flanged end of said cylindrical plunger has a plurality of apertures spaced thereabout, and said pinching means comprises a plurality of ball bearings, each of which is received by a corresponding aperture, said ball bearings being forced into pinching engagement with said connecting member by said tapered end of said housing as said flanged end of said cylindrical plunger is urged by said spring toward said tapered end of said housing, said pinching means creating a minimum resistance to the movement of said positioning means when said positioning means is slid toward said fastening means along said connecting member and said pinching means preventing the movement of said positioning means when said positioning means is urged away from said fastening means.

* * * * *